United States Patent [19]

Sokei

[11] Patent Number: 4,562,459
[45] Date of Patent: Dec. 31, 1985

[54] COLOR TELEVISION CAMERA
[75] Inventor: Hiroichi Sokei, Mobara, Japan
[73] Assignee: Hitachi, Ltd., Tokyo, Japan
[21] Appl. No.: 506,307
[22] Filed: Jun. 21, 1983
[30] Foreign Application Priority Data Jun. 23, 1982 [JP] Japan ............... 57-106951

[51] Int. Cl.⁴ .............. H04N 9/535; H04N 9/62; H04N 5/14; H04N 5/34
[52] U.S. Cl. .............. 358/27; 358/29; 358/163; 358/10
[58] Field of Search .......... 358/27, 29, 10, 163, 358/316, 21 R

[56] References Cited

U.S. PATENT DOCUMENTS 4,158,208 6/1979 Dischert ................ 358/10
4,326,219 4/1982 Griesshaber ............ 358/163
4,327,371 4/1982 Edson et al. ............ 358/10
4,354,243 10/1982 Ryan et al. ............. 358/10 X Primary Examiner—Michael A. Masinick
Assistant Examiner—Michael P. Dunnam
Attorney, Agent, or Firm—Charles E. Pfund

[57] ABSTRACT

In an NTSC system color television camera with a shading correction circuit, the correction circuit comprises differential amplifier means for comparing a level difference between Y and R signals and between Y and B signals to produce analog difference signals, analog-to-digital converter means for converting levels resulting from sampling the analog signals by clock pulses into digital signals, a random access memory for storing and reading the digital signals, and shading amplifier means responsive to the read-out signals to perform such an amplification that the chrominance signal level is made equal to the luminance signal level.

1 Claim, 2 Drawing Figures

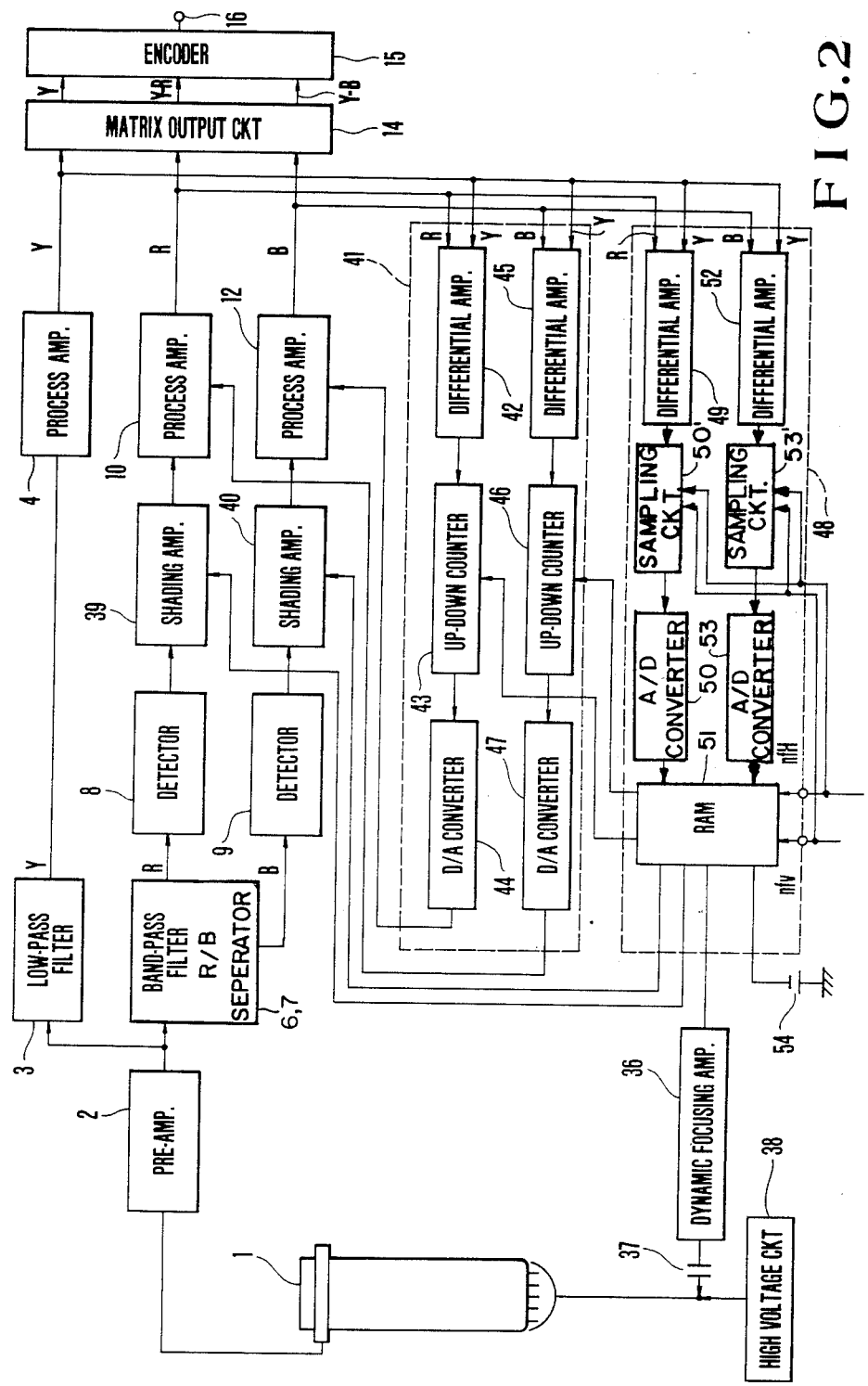
F I G. 2

COLOR TELEVISION CAMERA

BACKGROUND OF THE INVENTION

This invention relates to a color television camera and, more particularly, to a color television camera in which the shading correction and white balance correction can be automatically done.

A color television camera receives light from an object and produces a luminance signal and a chrominance signal corresponding to the incident light information, and various types of color television cameras have been proposed.

FIG. 1 is a block diagram showing a conventional single tube color television camera. Referring to FIG. 1, an image pick-up tube 1 has a color separation stripe filter of cyan and yellow. Illustrated in FIG. 1 are a pre-amplifier 2 for amplifying a video signal produced from the image pick-up tube 1, a low-pass filter 3 for trapping the carrier of the amplified video signal output of the pre-amplifier 2, a process amplifier 4 for amplifying a Y (luminance) signal output of the low-pass filter 3, a variable resistor 5 adapted to control the gain of the process amplifier 4, a band-pass filter 6 for passing the carriers of R (red) and B (blue) signals, an R/B separator for separating the R and B signals from the band-pass filter output, a detector 8 for detecting the R signal, a detector 9 for detecting the B signal, a process amplifier 10 for amplifying the R signal output of the detector 8, a variable resistor 11 adapted to control the gain of the process amplifier 10, a process amplifier 12 for amplifying the B signal output of the detector 9, a variable resistor 13 adapted to control the gain of the process amplifier 12, a matrix output circuit 14 receiving the Y, R and B signals to produce Y, (R - Y) and (B - Y) signals, an encoder 15 for producing an NTSC video signal from the output signals of the matrix output circuit 14, and an NTSC output terminal 16. A shading correction circuit 17 feeds shading correction signals to the R and B signal process amplifiers 10 and 12. It includes input terminals 18 and 19 for receiving external horizontal drive (HD) and vertical drive (VD) signals. It also includes a horizontal parabolic wave generator 20 for producing a parabolic wave signal controlled by the HD signal, a horizontal saw-tooth wave generator 21 for producing a horizontal saw-tooth wave signal controlled by the HD signal, a vertical parabolic wave generator 22 for producing a parabolic wave signal controlled by the VD signal, and a vertical saw-tooth wave generator 23 for producing a vertical saw-tooth wave signal controlled by the VD signal. It further includes variable resistors 24 to 35. The variable resistor 24 is adapted to control the horizontal parabolic wave signal which is fed to the B signal process amplifier 12. The variable resistor 25 is adapted to control the horizontal parabolic wave signal which is fed to the R signal process amplifier 10, the variable resistor 26 to control the horizontal saw-tooth wave signal which is fed to the B signal process amplifier 12, the variable resistor 27 to control the horizontal saw-tooth wave signal which is fed to the R signal process amplifier 10, the variable resistor 28 to control the vertical parabolic wave signal which is fed to the B signal process amplifier 12, the vertical resistor 29 to control the vertical parabolic wave signal which is fed to the R signal process amplifier 10, the variable resistor 30 to control the vertical saw-tooth wave signal which is fed to the B signal process amplifier 12, the vertical resistor 31 to control the vertical saw-tooth wave signal which is fed to the R signal process amplifier 10, the variable resistor 32 to control a horizontal parabolic wave signal for dynamic focusing correction, the variable resistor 33 to control a horizontal saw-tooth wave signal output for dynamic focusing correction, the variable resistor 34 to control a vertical parabolic wave signal output for dynamic focusing correction, and the variable resistor 35 to control a vertical saw-tooth wave signal output for dynamic focusing correction. The shading correction circuit 17 further includes fixed resistors r for setting the current levels of the individual signals. A dynamic focusing amplifier 36 amplifies the individual wave signal outputs for dynamic focusing correction to a fixed level to be coupled through a capacitor 37 to a focusing electrode in the image pick-up tube 1. The image pick-up tube 1 is supplied with a high voltage from a high voltage circuit 38 for its operation.

With the color television camera having the above construction, the video signal obtained from its NTSC signal output terminal 16 contains an amplitude distortion, in other words, "shading" which is introduced for various reasons. Accordingly, shading correction is usually done using the shading correction circuit 17. Usually, this shading correction for horizontal and vertical video signals is done in a total of 12 circuit connections for modulation shading and dynamic focusing of the red (R) and blue (B) channels, using the variable resistors 24 to 35 respectively connected to the parabolic wave generators 20 and 22 and saw-tooth wave generators 21 and 23. The adjustment of all the variable resistors 24 to 35, however, is time-consuming In addition, the adjustment level will differ with the individual operators, giving rise to irregularity of the picture quality.

SUMMARY OF THE INVENTION

The invention is directed to overcoming the drawbacks described above in the prior art, and its object is to provide a color television camera which can perform the shading adjustment in a very short time and obtain uniform picture quality.

According to the present invention, the above object can be accomplished by an NTSC system color television camera with a shading correction circuit, the correction circuit comprising differential amplifier means for comparing a level difference between Y and R signals and between Y and B signals to produce analog difference signals, analog-to-digital converter means for converting levels resulting from sampling the analog signals by clock pulses into digital signals, a random access memory for storing and reading the digital signals, and shading amplifier means responsive to the read-out signals to perform such an amplification that the chrominance signal level is made equal to the luminance signal level.

BRIEF DESCRIPTION OF THE DRAWINGS

FIG. 2 is a block diagram showing an embodiment of the color television camera according to the invention.

DESCRIPTION OF PREFERRED EMBODIMENT

Figure 1:
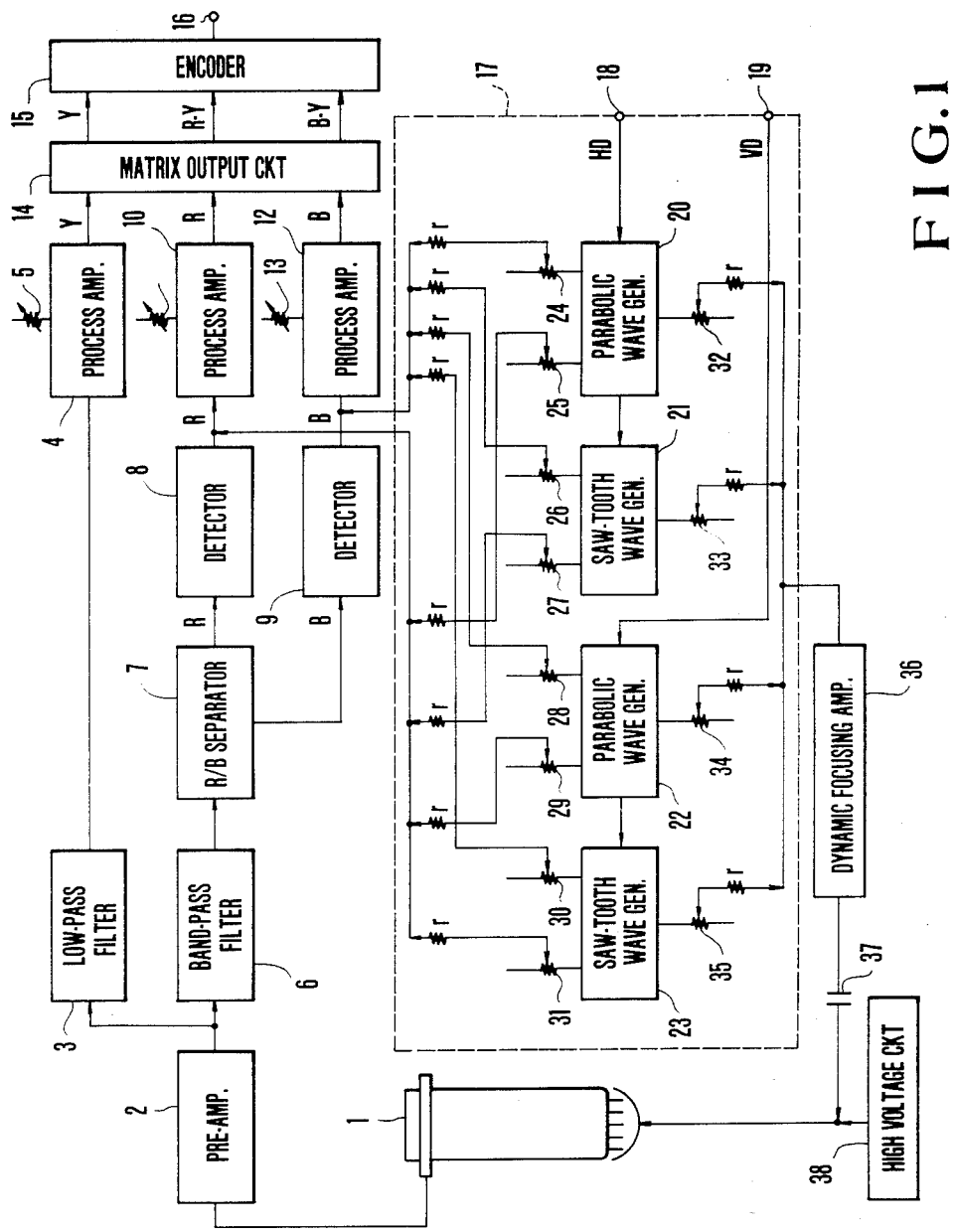
FIG. 1 is a block diagram showing a prior art color television camera.

FIG. 2 is a block diagram showing an embodiment of the color television camera according to the invention. In the figure, the identical parts with those in FIG. 1 are designated by like reference numerals. Referring to FIG. 2, a shading amplifier 39 for integrating the R signal is connected between detector 8 and process amplifier 10. Also, a shading amplifier 40 for integrating the B signal is connected between detector 9 and process amplifier 12. The embodiment further includes a white balance correction circuit 41 and a shading correction circuit 48. The white balance correction circuit 41 receives the Y, R and B signals from process amplifiers 4, 10 and 12, respectively, and detects the level differences of the R and B signals from the Y signal, i.e., the (Y - R) and (Y - B) signals. It further converts these difference signals into digital signals. The digitally converted (Y - R) signal is fed to the B signal process amplifier 12, while the digitally converted (Y - B) signal is fed to the R signal process amplifier 10. The gain of the process amplifiers 12 and 10 is controlled in this way. The white balance correction circuit 41 includes a differential amplifier 42 for comparing the Y and R signals, an up-down counter 43 for detecting the difference signal output of the differential amplifier 42, a digital-to-analog converter 44, a differential amplifier 45 for comparing the Y and B signals, an up-down counter 46 for detecting the difference signal output of the differential amplifier 45 and a digital-to-analog converter 47. The shading correction circuit 48, like the white balance correction circuit 41, receives the Y, R and B signals from the process amplifiers 4, 10 and 12 and detects the level difference of the R and B signals from the Y signal, i.e., the (Y - R) and (Y - B) signals. It further converts these difference signals into digital signals. The digital signals thus obtained are stored in a random access memory (RAM) 51 to be fed to the shading amplifiers 39 and 40, up-down counters 43 and 46 and dynamic focusing amplifier 36 under the control of external vertical and horizontal clock pulses nfv and nfH. The gain of the shading amplifiers 39 and 40 is controlled in this way. The shading correction circuit 48 includes, in addition to the RAM 51, a differential amplifier 49 for comparing the Y and R signals, a sampling circuit 50' an analog-to-digital converter 50, a differential amplifier 52 for comparing the Y and B signals, a sampling circuit 53' and an analog-to-digital converter 53. The RAM 51 is supplied with power from a power supply 54 for operation.

With the color television camera having the construction described above, a white pattern is imaged by the image pick-up tube 1, and the differences of the R and B signals from the Y signal, i.e., (Y - R) and (Y - B) signals that are obtained from the differential amplifiers 49 and 52 of the shading correction circuit 48 are sampled in circuits 50' and 53' respectively using the clock pulses nfv and nfH corresponding to individual regions into which the screen is divided, and converted by the analog-to-digital converters 50 and 53 into digital signals, which are stored in the RAM 51 to be read out in synchronism with the clock pulses as control signals for controlling the gain of the shading amplifiers 39 and 40. The R and B signals are thus amplified to the same level as the Y signals, so that shading correction can be automatically obtained. Further, the feeding of the same control signal as that fed to the shading amplifiers 39 and 40 to the dynamic focusing amplifier 36, the output of which is fed to the focusing electrode of the image pick-up tube 1, permits more perfect shading correction. Further, the differences of the R and B signals from the Y signal, i.e., (Y - R) and (Y - B) signals that are obtained from the differential amplifiers 42 and 45 of the white balance correction circuit 41 are detected by the up-down counters 43 and 46 to be converted by the digital-to-analog converters 44 and 47 in an interlocked relation to the shading correction for controlling the gain of the R and B signal process amplifiers 10 and 12, so that the white balance correction also can be automatically obtained.

As has been described in the foregoing, according to the invention the shading correction which has hitherto been carried out manually and time-consuming can be obtained automatically and in a short period of time and uniform picture quality can be ensured.

What is claimed is:

1. An NTSC system color television camera with a shading correction circuit, said correction circuit comprising:

differential amplifier means for comparing a level difference between Y and R signals and between Y and B signals to produce analog difference signals;

analog-to-digital converter means for converting levels resulting from sampling said analog signals by clock pulses corresponding to individual regions into which the screen of the tube is divided into digital signals;

a random access memory for storing and reading said digital signals in synchronism with said clock pulses; and shading amplifier means responsive to the readout signals to perform such an amplification that the chrominance signal level is made equal to the luminance signal level.

* * * * *